United States Patent
Kawai et al.

(10) Patent No.: US 7,472,211 B2
(45) Date of Patent: Dec. 30, 2008

(54) BLADE SERVER SWITCH MODULE USING OUT-OF-BAND SIGNALING TO DETECT THE PHYSICAL LOCATION OF AN ACTIVE DRIVE ENCLOSURE DEVICE

(75) Inventors: Yutaka Kawai, Tokyo (JP); Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 11/460,780

(22) Filed: Jul. 28, 2006

(65) Prior Publication Data
US 2008/0126635 A1 May 29, 2008

(51) Int. Cl.
G06F 13/00 (2006.01)
G06F 3/00 (2006.01)
G06F 12/00 (2006.01)

(52) U.S. Cl. .................. 710/74; 710/8; 710/72; 710/73; 711/151; 711/170; 714/5; 714/6; 714/42; 714/43

(58) Field of Classification Search ............ 710/8, 710/72–74; 711/170, 151; 714/5, 6, 42, 714/43
See application file for complete search history.

(56) References Cited

U.S. PATENT DOCUMENTS

| | | | |
|---|---|---|---|
| 5,841,997 A | 11/1998 | Bleiweiss et al. | |
| 6,532,547 B1 * | 3/2003 | Wilcox | 714/5 |
| 6,883,059 B2 | 4/2005 | Aruga | |
| 6,910,101 B2 | 6/2005 | Obara et al. | |
| 2003/0070085 A1 | 4/2003 | Fleming | |
| 2003/0159012 A1 | 8/2003 | Hirakata et al. | |
| 2004/0054939 A1 | 3/2004 | Guha et al. | |
| 2004/0264309 A1 | 12/2004 | Stolowitz | |
| 2005/0149653 A1 | 7/2005 | Suzuki et al. | |
| 2006/0282639 A1 * | 12/2006 | Liu et al. | 711/170 |
| 2008/0005331 A1 * | 1/2008 | Shiraishi | 709/226 |

\* cited by examiner

*Primary Examiner*—Tammara R Peyton
(74) *Attorney, Agent, or Firm*—Ingrassia Fisher & Lorenz, P.C.

(57) ABSTRACT

A system for communication between components in a computer storage system includes a drive enclosure device having a plurality of disk drives. A switch module is electrically coupled to the drive enclosure device. The module has a plurality of physical layer links (PHYs). The module generates out-of-band (OOB) signals to transmit to the drive enclosure device, detects a physical location of an active drive enclosure device by interrogating the PHYs, and sends a serial management protocol (SMP) instruction to the drive enclosure device to perform a task, the SMP instruction based on the physical location.

19 Claims, 5 Drawing Sheets

| BYTES | DATA | MEANING |
|---|---|---|
| 00h | 40h | SMP FRAME TYPE=SMP FUNCTION REQUEST |
| 01h | 40h | FUNCTION=VENDOR SPECIFIC(40h) |
| 02h-03h | 0000h | RESERVED |
| 04h | | 1b MEANS POWER ON ,0b MEANS POWER DOWN<br>BIT 7 : HDD No. 23<br>BIT 6 : HDD No. 22<br>BIT 5 : HDD No. 21<br>BIT 4 : HDD No. 20<br>BIT 3 : HDD No. 19<br>BIT 2 : HDD No. 18<br>BIT 1 : HDD No. 17<br>BIT 0 : HDD No. 16 |
| 05h | | 1b MEANS POWER ON ,0b MEANS POWER DOWN<br>BIT 7 : HDD No. 15<br>BIT 6 : HDD No. 14<br>BIT 5 : HDD No. 13<br>BIT 4 : HDD No. 12<br>BIT 3 : HDD No. 11<br>BIT 2 : HDD No. 10<br>BIT 1 : HDD No. 09<br>BIT 0 : HDD No. 08 |
| 06h | | 1b MEANS POWER ON ,0b MEANS POWER DOWN<br>BIT 7 : HDD No. 07<br>BIT 6 : HDD No. 06<br>BIT 5 : HDD No. 05<br>BIT 4 : HDD No. 04<br>BIT 3 : HDD No. 03<br>BIT 2 : HDD No. 02<br>BIT 1 : HDD No. 01<br>BIT 0 : HDD No. 00 |
| 07h-0Ah | | CRC VALUE |

REQUEST FORMAT

| BYTES | DATA | MEANING |
|---|---|---|
| 00h | 41h | SMP FRAME TYPE=SMP FUNCTION RESPONSE |
| 01h | 40h | FUNCTION=VENDOR SPECIFIC(40h) |
| 02h | | FUNCTION RESULT<br>00h : SMP FUNCTION ACCEPTED<br>02h : SMP FUNCTION FAILED<br>03h : INVALID REQUEST FRAME LENGTH |
| 03h | 00h | RESERVED |
| 04h-07h | CRC | CRC VALUE |

RESPONSE FORMAT 132  134  136

BLADE SERVER SWITCH MODULE USING OUT-OF-BAND SIGNALING TO DETECT THE PHYSICAL LOCATION OF AN ACTIVE DRIVE ENCLOSURE DEVICE

BACKGROUND OF THE INVENTION

1. Field of the Invention

The present invention relates in general to computers, and, more particularly, to an apparatus and method of a blade server switch module controlling a blade server storage blade including a Serial-Attached-SCSI (SAS) device via Serial Management Protocol (SMP).

2. Description of the Prior Art

So-called "blade server" computer systems feature a rackmount enclosure which can hold several "blades." The blades can include processor blades having a central processing unit and accompanying hardware, and storage blades having media systems such as disk drives arranged in a Redundant Array of Independent Disks (RAID) topology with accompanying controllers, switches and other associated hardware.

In a particular implementation of a blade server system, two separate RAID controller blades are connected to a third drive enclosure blade (DEB). The implementation takes the space of three blade slots in the blade server system's rack mount enclosure. Accompanying each DEB are multiple disk drive cards and controller cards to manage the DEB. The DEB implementation can be functionally equivalent to a Just-A-Bunch-Of-Disks (JBOD) storage array.

A series of external cables can be used to interconnect the DEBs and the RAID controllers. Connectivity is required to daisy chain all the related DEBs together and to also connect the RAID controllers and switches, such as SAS switches. The use of external cables to connect various storage blade components runs contrary to the original and subsequent design philosophies of a blade server computer system, that being to use an internal high-speed fabric which is integrated into the blade server system as a communications and data path. Traditionally, however, the internal high-speed fabric is generic in nature, making the use of the fabric for a specific application difficult.

Computer system design, and in this case design associated with storage devices, is constantly under pressure from the marketplace to provide larger amounts of storage in an increasingly cost-efficient manner. In light of this goal, a design which replaces external cabling with another solution must take cost and efficiency considerations into account.

Thus, a need exists for a system for connecting various storage components of a blade server computer system, such as a RAID controller, which uses the internal fabric of the blade server system rather than employing a network of external cables. In addition, a need exists for a method of configuring and controlling the various interconnected storage components without the use of external cables. The system and method must also take cost considerations into account.

SUMMARY OF THE INVENTION

In one embodiment, the present invention is a system for communication between components in a computer storage system comprising a drive enclosure device having a plurality of disk drives and a switch module electrically coupled to the drive enclosure device and having a plurality of physical layer links (PHYs), wherein the switch module generates out-of-band (OOB) signals to transmit to the drive enclosure device, detects a physical location of an active drive enclosure device by interrogating the PHYs with the OOB signals, and sends a serial management protocol (SMP) instruction to the active drive enclosure device to perform a task, the SMP instruction based on the physical location.

In another embodiment, the present invention is a computer storage system comprising a storage device and a switch module having a communication link with the storage device, wherein the switch module sends an out-of-band (OOB) signal to the storage device to detect the storage device in the system by interrogating physical layer links (PHYs) associated with the storage device to determine a physical location of the storage device, assigns the storage device to the physical location within the storage system, and sends serial management protocol (SMP) data to the storage device, the SMP data based on the physical location.

In still another embodiment, the present invention is a method of controlling a storage device by a switch module, comprising generating out-of-band (OOB) signals to transmit to the storage device, detecting an active storage device by interrogating a physical link (PHY) between the switch module and the storage device PHY using the OOB signals to determine a physical location of the active storage device, assigning the active storage device to the physical location, and sending a serial management protocol (SMP) instruction based on the physical location of the active storage device to the storage device.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
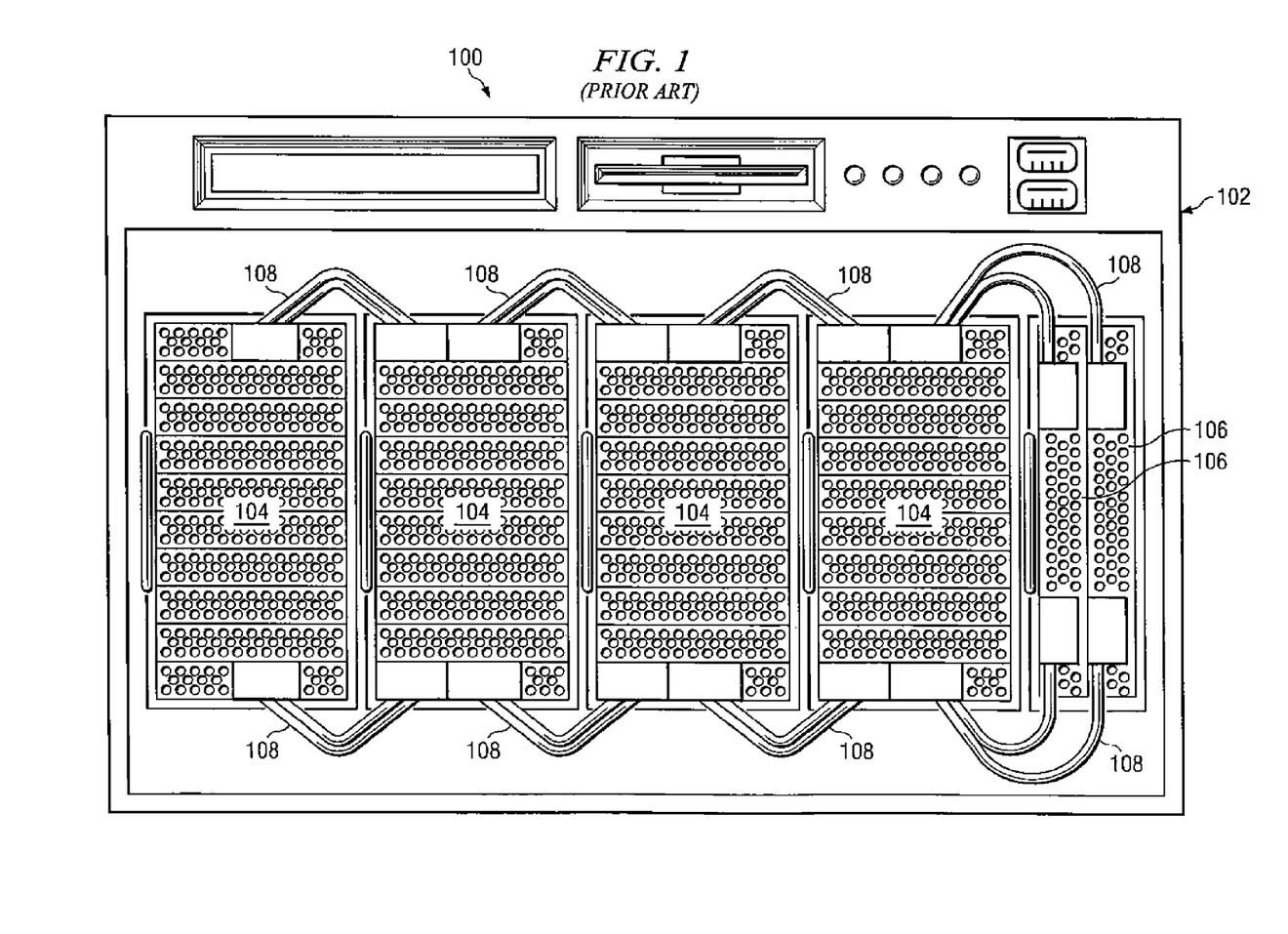
FIG. 1 illustrates a prior art example of a blade server storage system with external cables.

Turning to FIG. 1, an example blade server computer system 100 is shown. Blade server 100 consists of a rack-mount enclosure 102 having fourteen blade slots for various blade devices. In the implementation shown, four drive enclosure blades 104 (DEBs) are shown from left to right. Each DEB 104 is three standard blades wide. As a result, four DEBs 104 take up twelve standard blade server blade slots in system 100. Each DEB 104 contains a plurality of hard disk drives (HDDs) integrated into a series of interface cards. In the implementation shown, DEB 104 contains 24 HDDs, with three HDDs integrated per interface card. In addition to having four DEB 104 devices, two RAID controller blades 106 (RCBs) are shown, the first adjacent to the second, in the far right-hand space of system 100.

In various mass storage embodiments such as DEBs and their associated HDDs, the mass storage components can include the appropriate functionality to communicate over various device located layers such as an application layer, a transport layer, a link layer, and/or a physical layer, in accordance with various industry specifications. For example, DEBs 104 can provide the functionality to communicate via layers in accordance with a Serial-ATA industry standard interface specification, such as the Serial-ATA I interface specification (SATA) promulgated by the Serial ATA Working Group, the Serial ATA II interface specification promulgated by the Serial ATA II Work Group, or the SAS specification promulgated by the Serial Attached SCSI Working Group, or any progeny of these specifications. As illustrated, system 100 includes a series of external cables 108 which are daisy chained between each respective DEB 104 and RCB 106. Cables 108 are attached to various interface cards (controllers) which are mounted at the top and bottom of each DEB 104. In addition, cables 108 are connected to interface devices which link DEBs 104 with RCBs 106.

The use of SCSI Enclosure Services (SES) is commonplace in storage products as a conventional way to provide communication. SES is an industry-defined standard that functions to monitor and understand the environment of a storage device enclosure. In the case of the DEB/RAID controller implementation as previously described, SES functions to monitor and understand the environment of the DEB 104. SES can report temperature and report voltage excursions associated with the DEB 104. SES provides for powering on or off the HDDs integrated into each DEB 104.

To alleviate the requirement of external cabling, thereby using the internal, high-speed fabric of a blade server storage network, a system can be implemented which employs switching technology to route customer data through the generic high-speed fabric. The use of a DEB/RAID controller implementation is enhanced with the addition of SAS switch modules to provide increased performance and reliability across a network of storage devices, as will be further described. An implementation of SAS switch modules involves placing the modules logically between the RCBs and the DEBs. A SAS switch module can implement SES to control the power of a blade server storage system.

SAS switch (expander) architecture as defined by the SAS Standards T10 Committee can support three major functions. The first function is referred to as Serial SCSI Protocol (SSP). The employment of SSP is generally required to provide traditional SES functionality in a storage system. For a SAS switch module to have the capacity to control the power of a blade serve storage system, the switch module is required to implement SSP because the module is generally required to implement SES and actively issue commands to control the power of each DEB and its respective HDDs. The second function is referred to as Serial Management Protocol (SMP). SMP dictates how tasks are managed between the RCBs and the HDDs. Finally, the third function is referred to as Serial Advanced Technology Attachment Tunneled Protocol (STP), which is generally required to provide support for Serial-ATA (SATA) HDDs. For simple and very cost-sensitive designs, it is desirable to eliminate unnecessary functions such as SSP and correspondingly reduce the complexity and amount of firmware space required. To achieve this goal, a system can be implemented which incorporates a SAS switch with only SMP functionality. The SSP and STP functions can be removed to save firmware size of the switch module, which otherwise would consume ROM. Some SES functionality can be emulated while other unnecessary SES functions are eliminated. To accomplish this task, the vendor's SSP function (the SES function) is neither implemented nor compiled.

To achieve the goal of effecting desired portions of SES functionality without the extra memory associated with implementing all of the instructions found in a typical SSP function, a system and method can be implemented which detects activities of DEBs through out-of-band (OOB) signals and issues a vendor-specified SMP command to, for example, control power on/off of DEBs, without using true SES functions. The implementation of the system and method, as described below, makes it possible to reduce work load to implement SES functionality and still save firmware code size. In addition, by using a SAS switch component as will be described, the system can make use of the generic, high-speed fabric of a blade server system and avoid the requirement of using external cabling.

Figure 2:
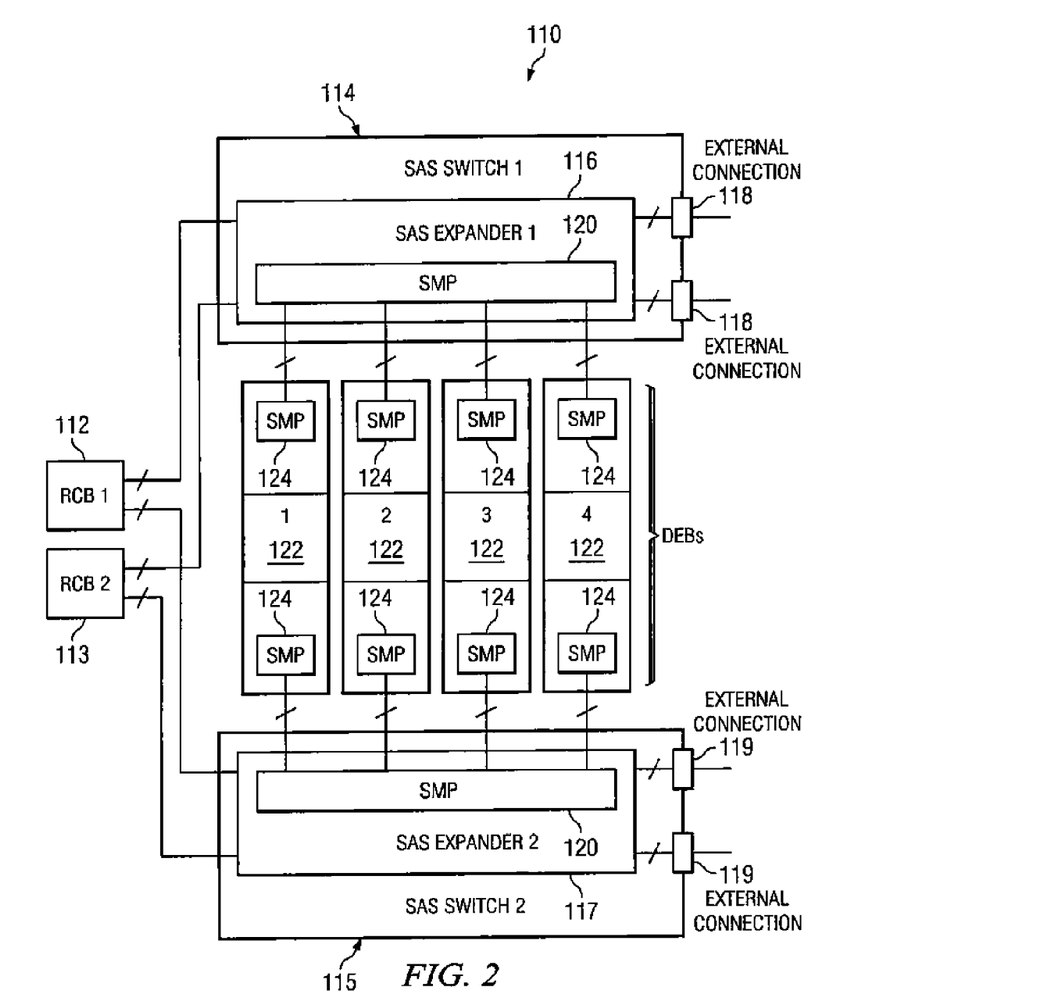
FIG. 2 illustrates a network of interconnected storage components, including RAID controller blades, SAS switches and expanders, and drive enclosure blades (DEBs)

Turning to FIG. 2, an example RCB/SAS Switch/DEB implementation is shown. RCBs 112,113 are connected to SAS switches 114,115 through a typical signal bearing medium. SAS switch modules 114,115 include SAS expander modules 116,117. SAS expanders 116,117 are generally industry-defined devices which function as cross-point switches. Use of the term "SAS switch module" is contemplated to refer to a higher-level, generic nomenclature which includes various switches and expanders as are industry standard. Inclusive to SAS expanders 116,117 are SMP modules 120. SMP modules 120 can include a logic control entity which can operate alternatively as software, hardware or a combination of software and hardware on SAS switches 114, 115. SMP modules 120 can provide an interface function between switches 114,115 and DEBs 122 as shown. Each DEB 122 includes a corresponding SMP module 124 which transmits/receives SMP information and otherwise interfaces DEB 122 with switches 114,115. Four DEBs 122 are shown linked to switches 114,115. Again, as previously described, expanders 116,117 are typically intended to integrate all SSP functionality, which generally adds cost and complexity.

Figure 3:
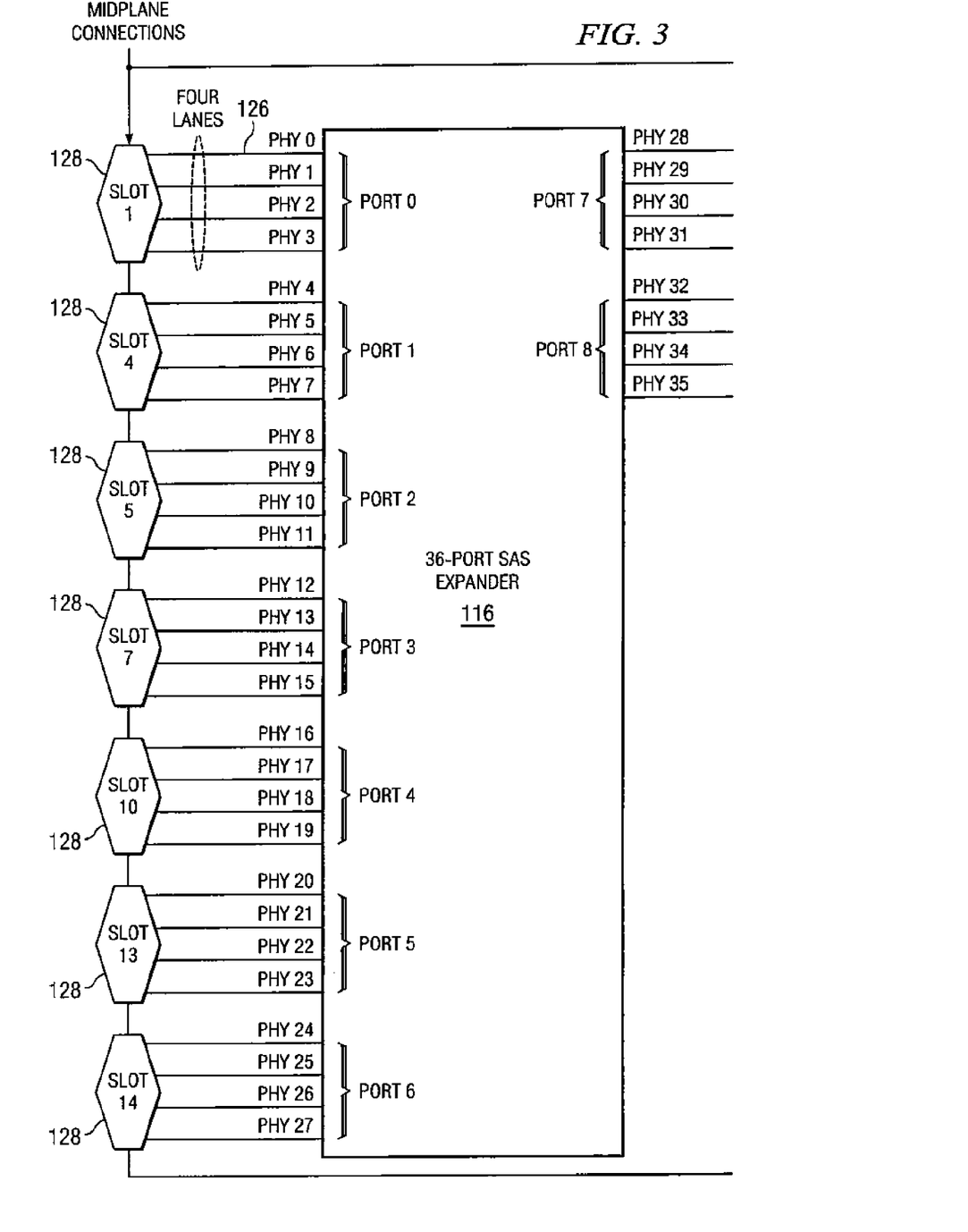
FIG. 3 illustrates a logical diagram of a SAS expander with associated physical links and slot connections.

Turning to FIG. 3, an example logical diagram of a 36-port SAS expander 116 with associated connections is shown. Various input/output (I/O) ports are shown, which are numbered from zero (0) to eight (8). Each port has four (4) respective physical layer links, or "PHYs" which connect each port with a particular slot 128 in the midplane chassis of a blade server computer system. For example, PHYs 0 through 3 are connected between Port 0 and Slot 1. In an example implementation, a DEB 122 spans three blade slots 128. The blade server system manages power to the DEB on a slot-by-slot basis. The example implementation can also include a partitioning of multiple power supply domains across the blade server chassis. These power supply domains are then split across the blade slots 128 in a particular fashion. Even though a DEB 122 spans three blade slots 128, it is possible to only connect into/interface into two slots 128 to power up the HDDs enclosed in each DEB 122.

Figures 4, 6:
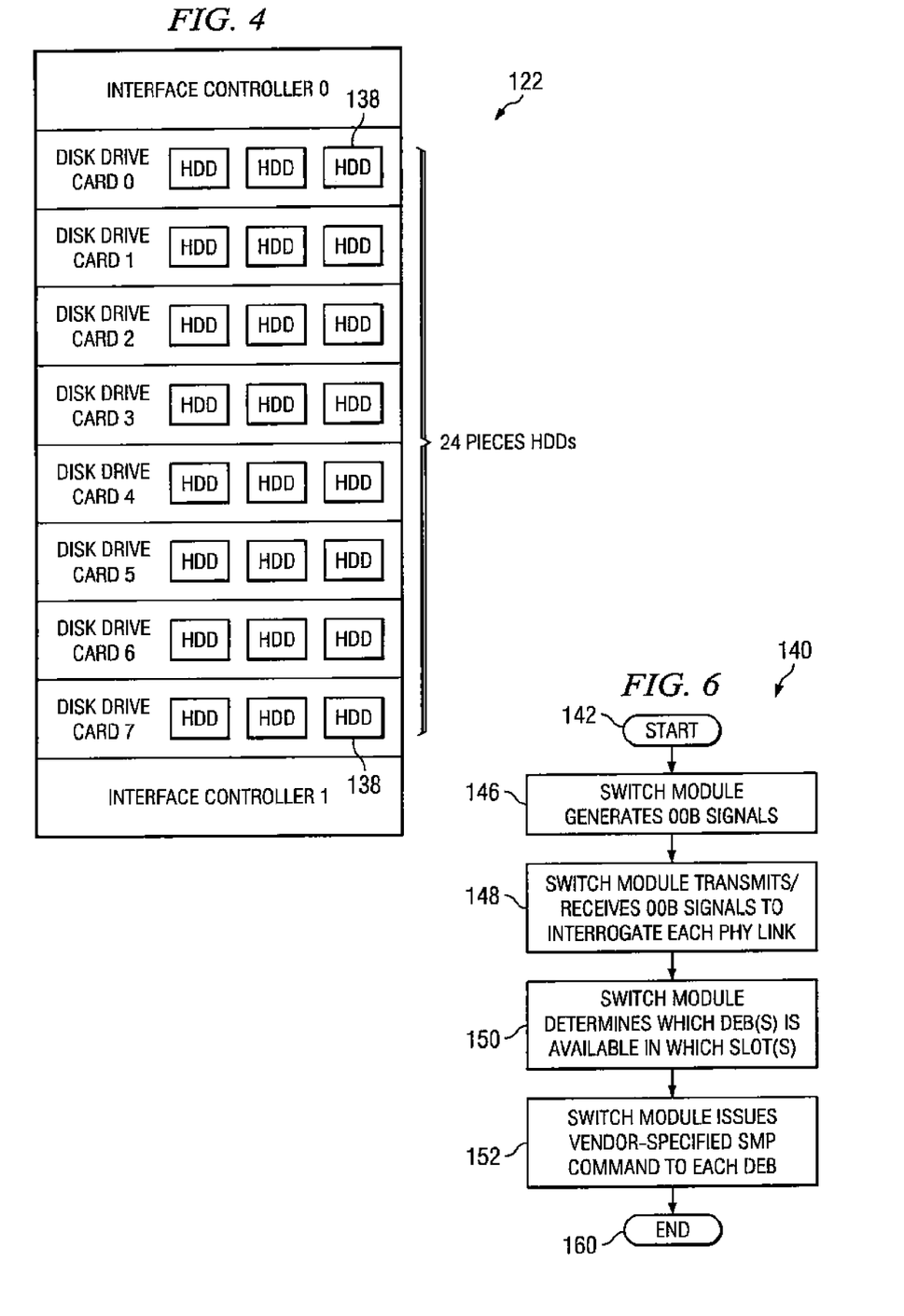
FIG. 4 illustrates a plurality of networked hard disk drives (HDDs) enclosed by a drive enclosure blade (DEB)
FIG. 6 illustrates a flow-chart diagram of an example method of operation of a switch module in a storage system.

FIG. 4 illustrates an example implementation of a DEB 122. Each DEB 122 is configured with two interface cards which provide a connection between the DEB 122 and external components. Shown enclosed between the two interface cards are a series of disk drive cards which contain HDDs. In this particular implementation, a series of three HDDs are integrated into each disk drive card. The total number of HDDs available total 24.

As previously described, switch module 114 utilizing the respective interface specification employed, whether it be SATA I, SATA II, SAS or otherwise, can include a physical layer (PHY) on which OOB signaling may be communicated to establish a communication link between RCBs 112,113, DEBs 122 and HDDs 138. As used herein, the term out-of-band signaling refers to any transmission of signals or information that takes place using frequencies or channels outside the normal frequencies or channels used for transfer of I/O commands and user data to and from RCBs 112,113, switches 114, expanders 116, DEBs 122 and the like.

Switch 114, using OOB and vendor unique commands, detects the DEBs 122 by monitoring the PHY status of each port 128. Switches 114, and, thereby, expanders 116, can have knowledge of which PHY link 126 is implemented or available. Switch 114 can then issue a vendor-specified SMP command to each DEB(s) 122 which is available in the blade server chassis. After the DEB(s) has received the SMP command, the DEB can then spin up its respective HDDs according as the context of the SMP command.

Consider an example operation A of a switch module 114 in the storage network implementation as described. First, the switch module 114 generates OOB signals to confirm whether a particular PHY link 126 is available or not. The switch module, as a preliminary step in initializing the storage network, needs to interrogate all of the PHYs 126. As previously described, each PHY 126 is assigned to one SAS port in expander 116. In each implementation, the respective SAS port/PHY configuration is fixed. As a result, the switch module 114 can know the activities of SAS ports as determined by the activities of PHYs 126. Returning to the instant example, when the switch module 114 wants to know whether a particular DEB 122 is available in the slot 1 or not, the module 114 checks the 4 PHYs 126, which are PHY 0, PHY 1, PHY 2, and PHY 3. If at least one of the PHYs 126 is available, the switch 114 can detect that a DEB 122 is available in the slot 1 because PHY 0, PHY 1, PHY 2, and PHY 3 are connected to the same SAS port, and, thereby, slot 1. Switch module 114 can repeat the operation for detecting whether a particular DEB 122 is available in another slot.

As a next step in operation A, the switch module 114 issues a vendor-specified SMP command to each DEB 122. In the present implementation as shown in FIG. 4, each DEB 122 has 24 HDDs. The SMP command can include the context which indicates which HDDs should be turned on or off. The DEBs 122 receive and decode the command, and then turn on/spin up HDDs according to the context of the SMP command. For example, when one SMP command which requests to turn on the No. 3 HDD is sent to the DEB inserted in the slot 1, the DEB 122 in the slot 1 turns on No. 3 HDD in the DEB 122. When the same command is sent to all DEBs 122 in the network, all No. 3 HDDs in all the DEBs 122 are turned on. Therefore, the switch module 114 can control powers of HDDs in the DEBs 122 flexibly. In addition to a vendor-specified command that instructs a HDD to power on/power off, a variety of unique SMP commands can be written to accomplish a particular task for a desired situation.

Figure 5:
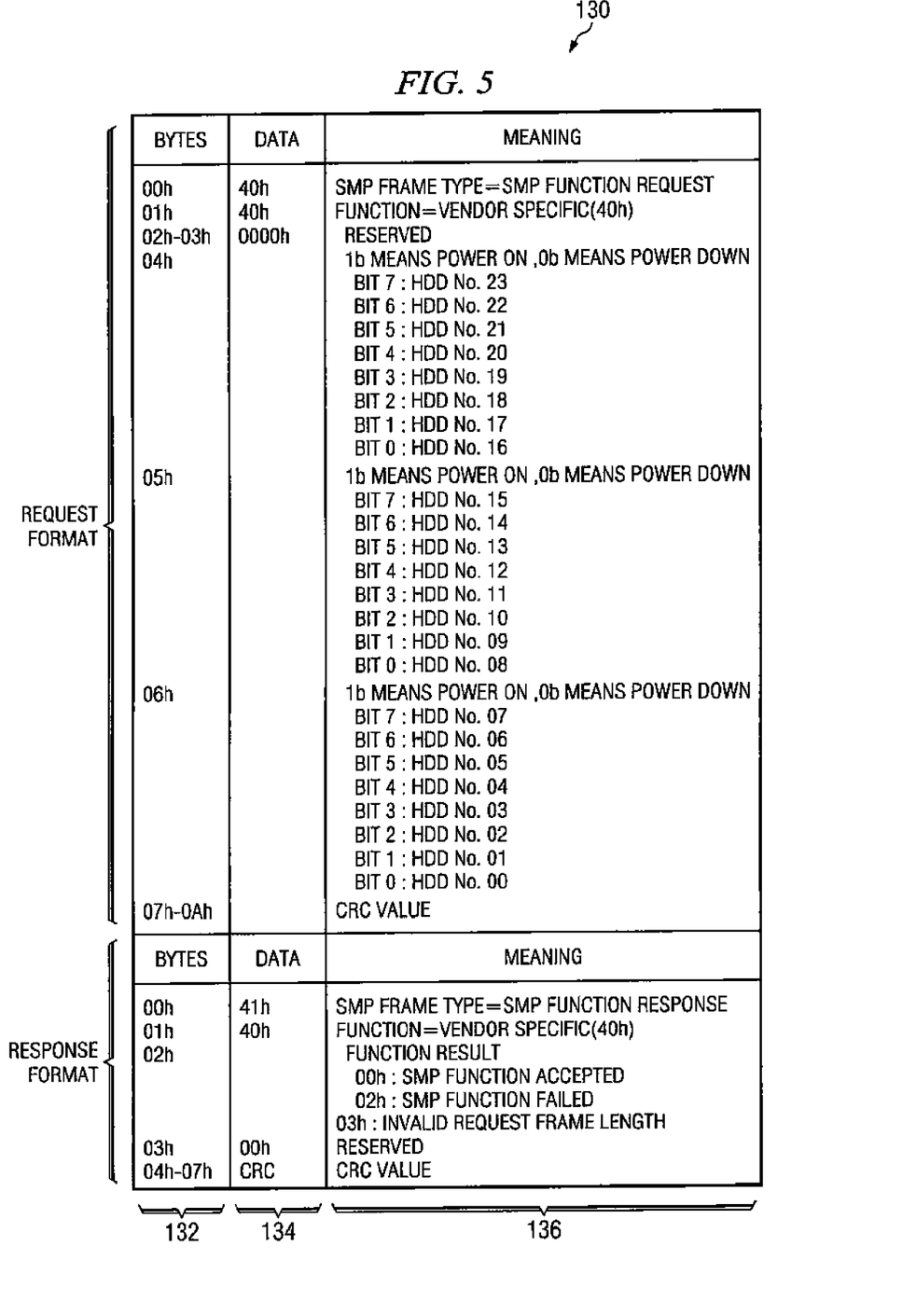
FIG. 5 illustrates an example serial management protocol (SMP) command instruction.

Turning to FIG. 5, an example of a vendor-specific SMP command 130 is depicted. The example SMP command 130 is designed to power on/power down a particular HDD. Command 130 is broken down into a request format and a response format. Column 132 identifies which bytes of the instruction are utilized. Column 134 identifies the value of the data. Finally, column 136 describes the meaning of a particular bit in the instruction. For example, a high bit 7 in byte 04h will instruct HDD No. 23 to power on, a low bit 7 in 05h will instruct HDD No. 15 to power down, and so on.

Turning to FIG. 6, an example method using the described implementation is depicted in a flow-chart diagram. Start 142 begins the process. The switch module generates OOB signals to confirm whether a particular PHY link is available or not in step 146. As a next step 148, the switch module transmits/receives the OOB signals to interrogate each PHY link in a predefined discovery process. Based on the results of the OOB interrogation, the switch module makes a determination which DEBs are available in which slots in step 150. Once the switch module has identified available DEBs and assigned them to a particular slot the switch module issues a vendor-specified SMP command to each DEB in step 152. Step 160 ends the operation.

Use of a SAS switch 114 component to internally connect the RCBs 112,113 and DEBs 122 serves to alleviate the requirement of using external cables to daisy chain RCBs 112,113 and DEBs 122 together. The SAS switch allows the use of internal, high-speed fabrics integrated into the chassis of the blade server system to handle customer data. The use of emulated SES functionality to manage multiple power domains integrated across slots 128 enables a switch 114 component to control the operation of a large plurality of HDDs in a flexible manner.

To illustrate this flexibility of control, consider the following example implementation. As previously indicated, a storage network having four DEBs 122 can include upwards of 96 HDDs. As a result, it is unacceptable to power on all 96 HDDs at the same time. If this were allowed, the DEB 122 would far exceed a specified power envelope and excessive inrush current would perturbate the shared power domain. To avoid this scenario, the switch 114 can implement a predetermined SMP command or series of commands to selectively power up/power down all of the HDDs to accommodate the multiple shared power domain's requirements of the storage network. In addition to providing flexibility of power control, the switch can effect a variety of predetermined SMP commands to satisfy a given need.

While one or more embodiments of the present invention have been illustrated in detail, the skilled artisan will appreciate that modifications and adaptations to those embodiments may be made without departing from the scope of the present invention as set forth in the following claims.

What is claimed is:

1. A system for communication between components in a computer storage system, comprising:
   a drive enclosure device having a plurality of disk drives; and
   a switch module electrically coupled to the drive enclosure device and having a plurality of physical layer links (PHYs), wherein the switch module
   generates out-of-band (OOB) signals to transmit to the drive enclosure device,
   detects a physical location of an active drive enclosure device by interrogating the PHYs with the OOB signals, and
   sends a serial management protocol (SMP) instruction to the active drive enclosure device to perform a task, the SMP instruction based on the physical location.

2. The system of claim 1, wherein the drive enclosure device further comprises a blade form factor for insertion into a blade server computer system.

3. The system of claim 1, wherein the switch module is compliant with a Serial Attached SCSI (SAS) specification.

4. The system of claim 1, wherein the task further includes powering at least one of the plurality of disk drives of the active drive enclosure device at the physical location.

5. The system of claim 4, wherein powering on one of the plurality of disk drives is selectively performed according to a predefined schedule to avoid perturbation of a shared power domain of the computer storage system.

6. A computer storage system, comprising:
   a storage device; and
   a switch module having a communication link with the storage device, wherein the switch module
   sends an out-of-band (OOB) signal to the storage device to detect the storage device in the system by interrogating physical layer links (PHYs) associated with the storage device to determine a physical location of the storage device,
   assigns the storage device to the physical location within the storage system, and
   sends serial management protocol (SMP) data to the storage device, the SMP data based on the physical location.

7. The system of claim 6, wherein the storage device further includes a drive enclosure device having a plurality of hard disk drives integrated into the drive enclosure device for providing storage of customer data.

8. The system of claim 7, wherein the drive enclosure device further comprises a blade form factor for insertion into a blade server computer system.

9. The system of claim 6, wherein the switch module is compliant with a Serial Attached SCSI (SAS) specification.

10. The system of claim 6, wherein the serial management protocol (SMP) data further includes an instruction to power on or off the storage device.

11. The system of claim 10, wherein the instruction is selectively performed according to a predefined schedule to avoid perturbation of a shared power domain of the computer storage system.

12. The system of claim 6, wherein the switch module is implemented as a logic control entity operating alternatively as software, hardware or a combination of software and hardware on the computer storage system.

13. A method of controlling a storage device by a switch module, comprising:
   generating out-of-band (OOB) signals to transmit to the storage device;
   detecting an active storage device by interrogating a physical link (PHY) between the switch module and the storage device PHY using the OOB signals to determine a physical location of the active storage device;
   assigning the active storage device to the physical location; and
   sending a serial management protocol (SMP) instruction based on the physical location of the active storage device to the storage device.

14. The method of claim 13, wherein the storage device is a drive enclosure device having a plurality of hard disk drives integrated into the drive enclosure device for providing storage of customer data.

15. The method of claim 14, wherein the drive enclosure device further comprises a blade form factor for insertion into a blade server computer system.

16. The method of claim 13, wherein the switch module is compliant with a Serial Attached SCSI (SAS) specification.

17. The method of claim 13, wherein the serial management protocol (SMP) data further includes an instruction to power on or off the storage device.

18. The method of claim 17, further including selectively performing the instruction by the storage device according to a predefined schedule to avoid perturbation of a shared power domain of a computer storage system.

19. The method of claim 13, wherein the switch module is implemented as a logic control entity operating alternatively as software, hardware or a combination of software and hardware on a computer storage system.

* * * * *